United States Patent
Bradshaw et al.

(10) Patent No.: US 9,545,832 B2
(45) Date of Patent: Jan. 17, 2017

(54) ELECTRICALLY SWITCHABLE LOCKING TORQUE STRUT

(71) Applicants: Jeff Bradshaw, Bloomfield, MI (US); Steve Telando, Howell, MI (US)

(72) Inventors: Jeff Bradshaw, Bloomfield, MI (US); Steve Telando, Howell, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 55 days.

(21) Appl. No.: 14/373,757

(22) PCT Filed: Jan. 23, 2013

(86) PCT No.: PCT/US2013/022796
§ 371 (c)(1),
(2) Date: Jul. 22, 2014

(87) PCT Pub. No.: WO2013/112621
PCT Pub. Date: Aug. 1, 2013

(65) Prior Publication Data
US 2014/0346722 A1 Nov. 27, 2014

Related U.S. Application Data

(60) Provisional application No. 61/589,621, filed on Jan. 23, 2012.

(51) Int. Cl.
*F16F 7/00* (2006.01)
*B60G 17/017* (2006.01)
(Continued)

(52) U.S. Cl.
CPC .............. *B60G 17/017* (2013.01); *B60G 17/00* (2013.01); *F16F 7/082* (2013.01); *F16F 7/09* (2013.01)

(58) Field of Classification Search
CPC .............. F16F 9/00; F16F 9/0254; F16F 9/56; F16B 15/262; B60G 17/00; B60G 17/017
See application file for complete search history.

(56) References Cited

U.S. PATENT DOCUMENTS 3,807,678 A * 4/1974 Karnopp .............. B60G 17/018
188/266.5
4,185,720 A * 1/1980 Wright, Jr. .............. F16L 3/202
188/134

(Continued)

FOREIGN PATENT DOCUMENTS

DE 14 30 178 A1 1/1970
DE 195 32 510 C2 3/1997

OTHER PUBLICATIONS

EP 13741342.3 Supplementary European Search, mailed Oct. 8, 2015.
PCT/US2013/022796 International Search Report/Written Opinion.

*Primary Examiner* — Bradley King
*Assistant Examiner* — James Hsiao
(74) *Attorney, Agent, or Firm* — Fay Sharpe LLP

(57) ABSTRACT

A switchable locking torque strut assembly and associated method are provided. The strut assembly is interposed between an associated vehicle chassis and an associated vehicle powertrain to provide high elastomeric rate resistance during start-up and/or shutdown of an associated internal combustion engine (ICE) and low elastomeric rate resistance during idle and/or driving events. The strut assembly includes a housing and a shaft at least partially received in the housing and operatively mounted for selective relative movement relative to the housing. A locking assembly is interposed between the strut and the housing for selectively locking the strut relative to the housing in response to start-up and/or shutdown of the ICE.

15 Claims, 4 Drawing Sheets

(51) Int. Cl.
*B60G 17/00* (2006.01)
*F16F 7/08* (2006.01)
*F16F 7/09* (2006.01)

(56) References Cited

U.S. PATENT DOCUMENTS

| | | | | |
|---|---|---|---|---|
| 4,309,027 A * | 1/1982 | Molders | F16F 9/0254 | 188/300 |
| 4,527,780 A * | 7/1985 | Bich | F16F 9/0254 | 267/120 |
| 4,536,114 A * | 8/1985 | Belew | B64C 1/641 | 244/118.1 |
| 4,957,279 A * | 9/1990 | Thorn | F16F 13/04 | 248/562 |
| 5,190,392 A * | 3/1993 | Parma | B64G 1/641 | 403/171 |
| 5,213,315 A * | 5/1993 | Hartel | B60K 5/1283 | 267/140.11 |
| 5,257,680 A * | 11/1993 | Corcoran | F16F 7/02 | 188/129 |
| 5,486,056 A * | 1/1996 | Thorn | A47C 1/027 | 297/354.12 |
| 5,538,115 A * | 7/1996 | Koch | A47C 3/30 | 188/266.6 |
| 6,241,223 B1 * | 6/2001 | Gugsch | F16F 1/387 | 267/140.13 |
| 6,378,671 B1 * | 4/2002 | Carlson | B62D 5/006 | 188/267.2 |
| 6,955,248 B2 * | 10/2005 | Park | F16F 7/09 | 188/129 |
| 7,354,363 B2 * | 4/2008 | Foster | F16H 7/1236 | 474/110 |
| 7,717,239 B2 * | 5/2010 | Berry, Jr. | F16F 7/08 | 188/381 |
| 7,888,901 B2 * | 2/2011 | Larson | B64C 13/04 | 318/568.11 |
| 9,139,065 B2 * | 9/2015 | Yamashita | F16F 9/342 | |
| 2006/0011429 A1 | 1/2006 | Park et al. | | |
| 2009/0194920 A1 * | 8/2009 | Love | B60G 13/04 | 267/121 |
| 2009/0236783 A1 * | 9/2009 | Doffing | F16F 9/0254 | 267/124 |
| 2013/0307203 A1 * | 11/2013 | Krajenke | E05F 1/1091 | 267/124 |

* cited by examiner

ELECTRICALLY SWITCHABLE LOCKING TORQUE STRUT

This application claims the priority benefit of U.S. provisional application 61/589,621, filed 23 Jan. 2012.

BACKGROUND

In order to make vehicles more fuel efficient, many manufacturers are implementing "Start/Stop" technology, where the engine is shut off when the vehicle comes to a stop and is restarted when acceleration is required. With the engine starting and stopping so frequently, reducing the occupant vibrations during these events is paramount.

The issue this disclosure is trying to solve is to control the high displacement vibrations generated during start-up and shut-down of ICE engines. This is an issue with most internal combustion engines, regardless of whether they are gas, diesel or hybrid (although some hybrids have a generator/motor that may reduce or prevent these vibrations).

Start-up is generally the bigger of the two issues, as the ignition cycle causes the powertrain to displace violently. The large displacement vibrations from this event cause noise and unwanted excitations in the passenger compartment. Shutdown typically does not create as high excitations (as it is not being driven by the combustion cycle), although shutdown can still create noise and unwanted excitations in the passenger compartment. When the ignition is shut off, the engine slows and RPMs drop, and as this occurs self-generated frequencies or engine orders excite low frequency rigid body modes in both the powertrain and chassis. This creates natural frequency oscillations which can intrude into the passenger compartment, disturbing the occupants.

Therefore a need exists for an inexpensive, reliable solution to address these oscillations.

SUMMARY

A switchable locking torque strut assembly is interposed between an associated vehicle chassis and an associated vehicle powertrain that provides high elastomeric rate resistance during start-up and/or shutdown of an associated internal combustion engine (ICE) and low elastomeric rate resistance during idle and/or driving events. The strut assembly includes a housing and a shaft at least partially received in the housing and operatively mounted for selective relative movement relative to the housing. A locking assembly is interposed between the shaft and the housing for selectively locking the shaft relative to the housing in response to start-up and/or shutdown of the ICE.

The locking assembly includes an expander and a generally annular collet that is selectively increased in dimension by the expander.

The expander and the collet each include cooperating surfaces that selectively increase and decrease a diameter of the collet as the expander and collet are moved relative to one another.

The locking assembly includes one of a solenoid or a motor/screw assembly that advances and retracts the collet by advancing and retracting the expander relative to the collet.

An elastomeric member and the expander are operatively connected to the associated vehicle and the shaft that expands the elastomeric member into engagement between the shaft and the housing.

In one embodiment, the locking assembly includes a motor and a drive screw operatively connected to the motor and to the expander for selectively advancing the expander relative to the elastomeric member that expands the elastomeric member into operative engagement with the housing and retracts the expander relative to the elastomeric member.

In another embodiment, the locking assembly includes a solenoid operatively connected to the expander for directly advancing and retracting the expander, and the elastomeric member is a rubber coating on at least a portion of the collet.

A biasing member urges the expander and the collet apart.

A method of selectively providing high elastomeric rate resistance between a chassis and a powertrain and low elastomeric rate resistance therebetween is provided. The method includes providing a strut having first and second ends between the chassis and the powertrain. The method further includes selectively locking the first end of the strut from moving relative to the second end, and selectively unlocking the first end of the strut to move relative to the second end.

The method includes configuring an elastomeric member as a part of the strut whereby the elastomeric member locks the first and second ends from moving relative to one another.

The method includes expanding the elastomeric member to radially lock the first and second ends.

The selectively locking step includes expanding the elastomeric member during start-up and/or shutdown of an associated internal combustion engine (ICE).

The selectively unlocking step occurs during idle and/or driving events.

One advantage of the present disclosure is the ability to control the motion of an internal combustion engine (ICE) during start-up and shut-down events, as an aid to the existing powertrain mounting system.

Another advantage is the provision of high elastomeric rate resistance during start-up and shutdown to control powertrain motion thereby reducing vibration excitations to the occupant during start/stop events.

Yet another benefit is the ability to switch to a low elastomeric rate state during idle and drive events for improved powertrain isolation.

A further benefit resides in the simple construction and method of operation.

Still other benefits and advantages will become apparent to those skilled in the art upon reading and understanding the following detailed description.

DETAILED DESCRIPTION

This strut works in a very simple fashion. One end is fastened through the isolator to the chassis (or cradle) and the other end is fastened through the isolator to the powertrain. The strut locks during the start-up and shutdown cycles, allowing only the rubber isolators to move, generating a high elastomeric rate along the axis of the strut. Positioned in the direction of greatest excitation of the engine, this will reduce the displacement of the powertrain, thereby reducing the vibration and noise perceived by the vehicle occupants. Once start-up or shutdown is complete, the strut is unlocked, and the shaft is allowed to travel in and out of the outer housing, providing little resistance to this motion, and isolating any incoming vibrations regardless of the shaft position relative to the housing.

This strut provides high elastomeric rate resistance during start-up and shutdown to control powertrain motion thereby reducing vibration excitations to the occupant during start/stop events, and switches to a low elastomeric rate state during idle and drive events for improved powertrain isolation.

Figure 1:
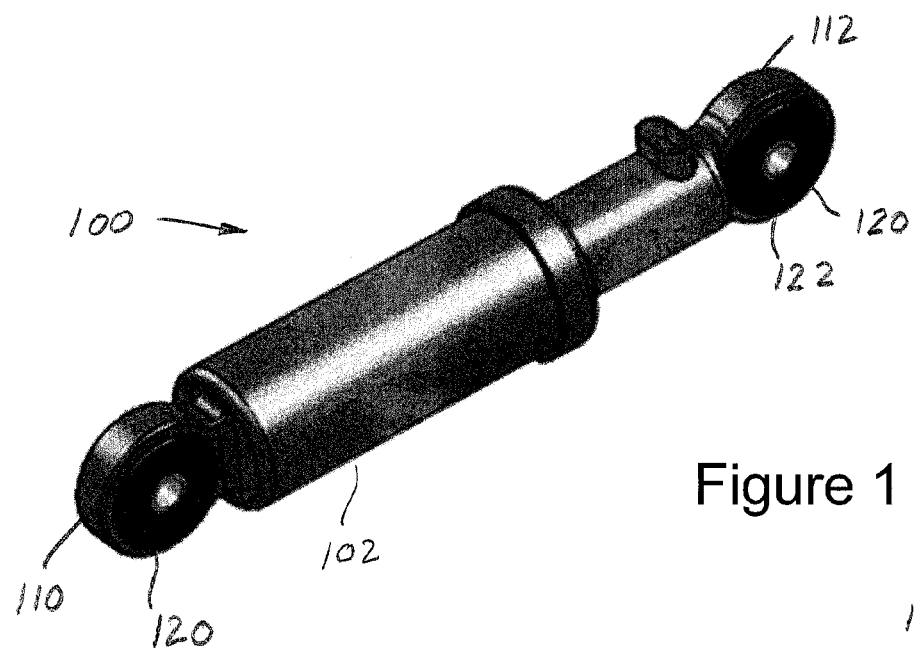
FIG. 1 is a perspective view of a strut assembly.
Figure 2:
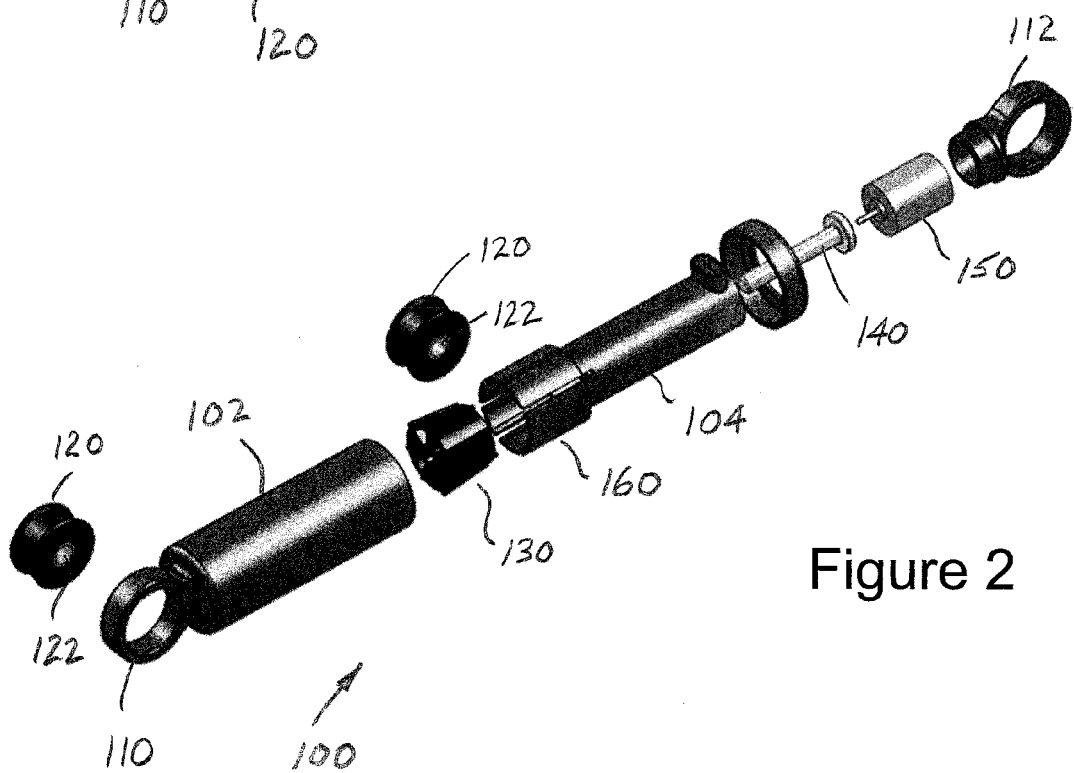
FIG. 2 is an exploded perspective view of the strut assembly of FIG. 1.
Figure 3:
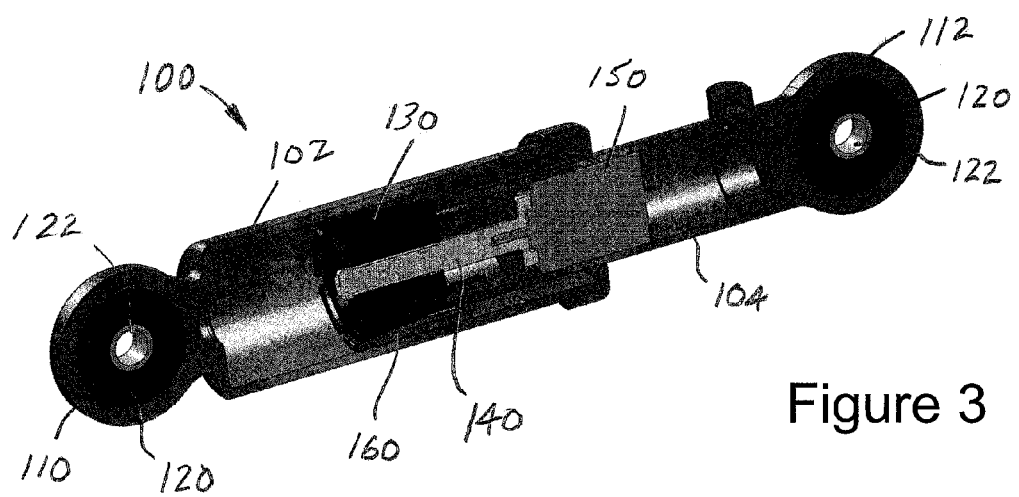
FIG. 3 is a longitudinal, cross-sectional view in perspective of the assembled strut assembly of FIG. 1.

In a first exemplary embodiment shown in FIGS. 1-3, strut assembly 100 includes a first portion or housing 102 at a first end of the strut assembly that at least partially receives a second portion or shaft 104 that forms a second end of the strut assembly. Each end of the strut assembly includes an eyelet 110. The housing 102 includes an eyelet 110 and the shaft includes an eyelet 112. Each eyelet 110, 112 receives a rubber isolator or bushing 120 that includes a central metal shaft 122. The eyelets 110, 112, with the rubber bushing 120 received therein, provide for attachment to the chassis or cradle (not shown) and the powertrain (not shown). An expander 130 has a threaded inner diameter which engages with a threaded outer diameter of the drive screw 140. A motor 150 (which can be either a basic DC motor or stepper motor, for example) rotates or spins the drive screw 140 thereby moving the expander 130 along the axis of the drive screw. As the expander 130 is drawn toward the motor 150, a tapered outer diameter of the expander presses against a tapered inside diameter of a collet 160 received on one end of the shaft 104. Drawing the expander 130 into the collet 160 expands the collet radially outward against the inside diameter surface of the housing 102. This binds the collet 160 to the inside of the housing 102, preventing the shaft 104 from moving with respect to the housing. This is the locked state of the strut assembly, i.e., the first end (housing 102) and the second end (shaft 104) of the strut assembly 100 are locked against relative movement with respect to one another when the expander 130 is received within the collet 160 and expands the collet radially outward into engagement with the housing 102.

When the motor 150 is operated or run in the reverse direction, the expander 130 is forced away from the motor and thereby collapses the collet 160. This allows the shaft 104 to slide freely within the housing 102. This is the unlocked state of the strut assembly 100.

Figure 4:
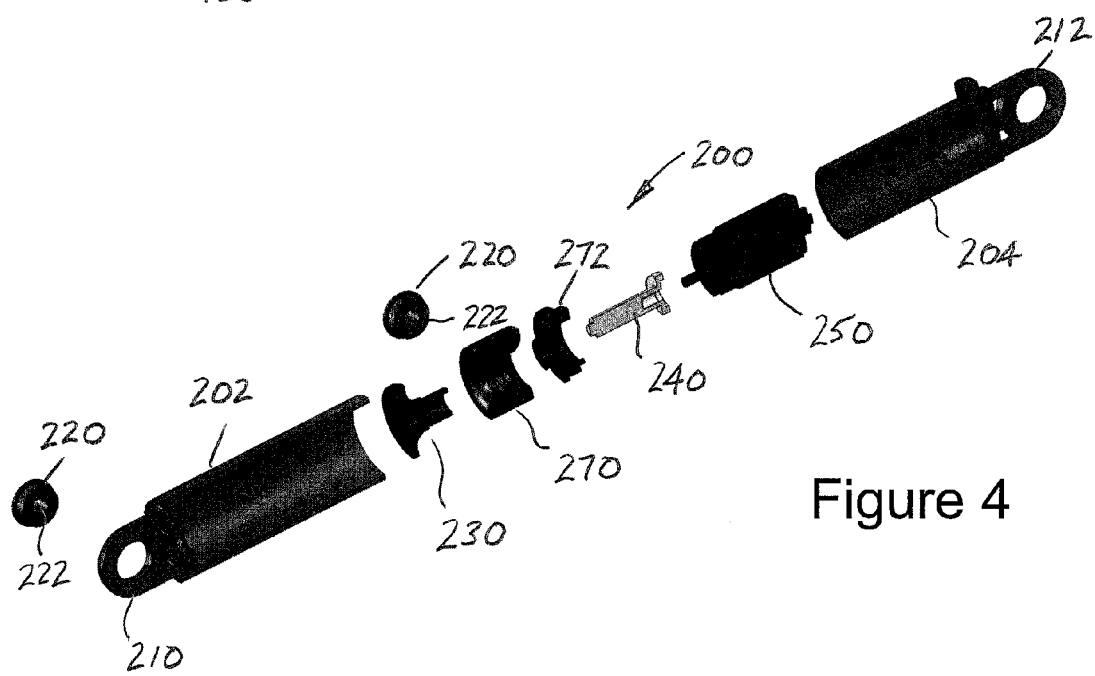
FIG. 4 is a an exploded perspective view of an alternative strut assembly.
Figure 5:
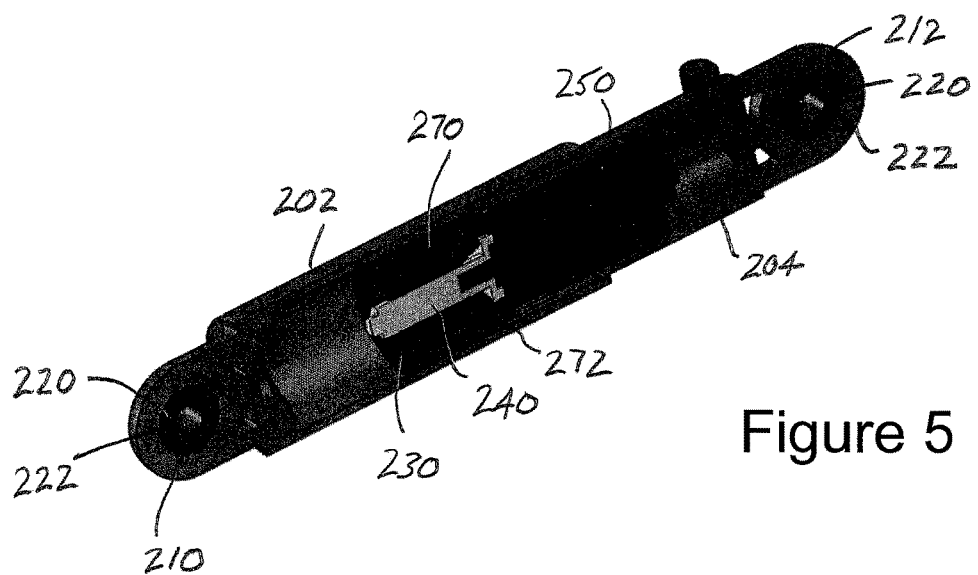
FIG. 5 is a longitudinal, cross-sectional view in perspective of the alternative assembled strut assembly of FIG. 4.

In a second exemplary embodiment (FIGS. 4-5), like elements are identified by like reference numerals in the "200" series (e.g., housing 102 is now referred to as housing 202), and new components are identified by new reference numerals. Thus, strut assembly 200 includes a first portion or housing 202 that at least partially receives a second portion or shaft 204. Each of the housing 202 and shaft 204 includes an eyelet 210, 212, respectively, that receives a rubber isolator or bushing 220 that includes a metal shaft 222 along its inner diameter. This allows opposite ends of the strut assembly 200 to be secured to the chassis/cradle and the powertrain, respectively. An expander 230 has a threaded inner diameter which engages with a threaded outer diameter of a drive screw 240. A motor 250 (which can be either a basic DC motor or stepper motor, for example) rotates or spins the drive screw 240 thereby moving the expander 230 along the axis of the drive screw. As the expander 230 is drawn toward the motor 250, the expander compresses a rubber member or compressible grommet such as a rubber grommet 270, forcing the grommet to expand against an inside diameter surface of a housing 202. More particularly, the rubber grommet 270 is compressed between the expander 230 and a shaft end cap 272 when the expander 230 is drawn toward the motor 250 as the motor rotates in a first direction. This compresses the grommet 270 axially between the expander 230 and the shaft end cap 272, and radially expands the grommet against the inside of the housing, preventing the shaft 204 from moving with respect to the housing 202. This is the locked state of the strut.

When the motor 250 is run in the reverse direction, the expander 230 is forced away from the motor allowing the compressed rubber grommet 270 to withdraw from the inside diameter surface of the housing 202, and allowing the shaft 204 to slide freely within the housing. This is the unlocked state.

Figure 6:
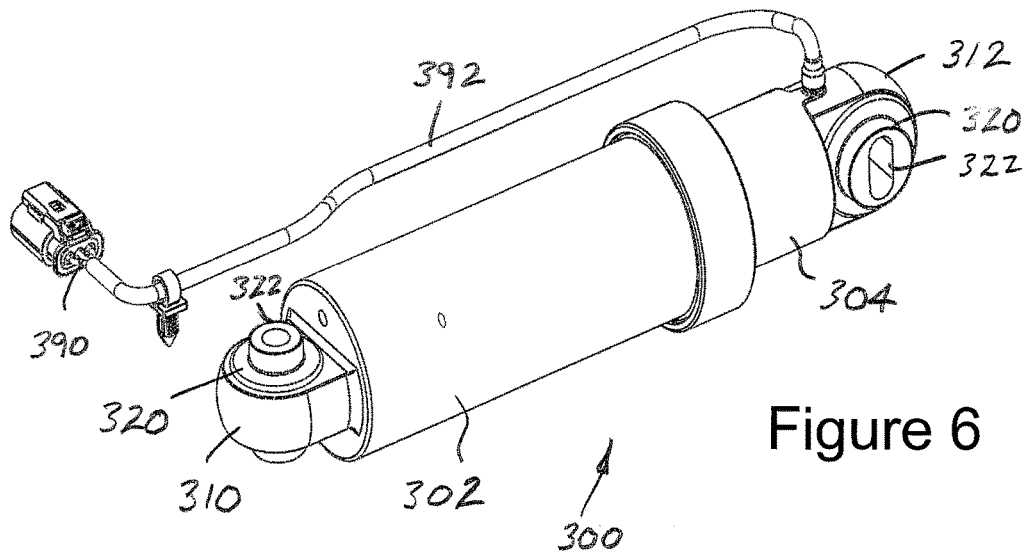
FIG. 6 is a perspective view of another alternative strut assembly.
Figure 7:
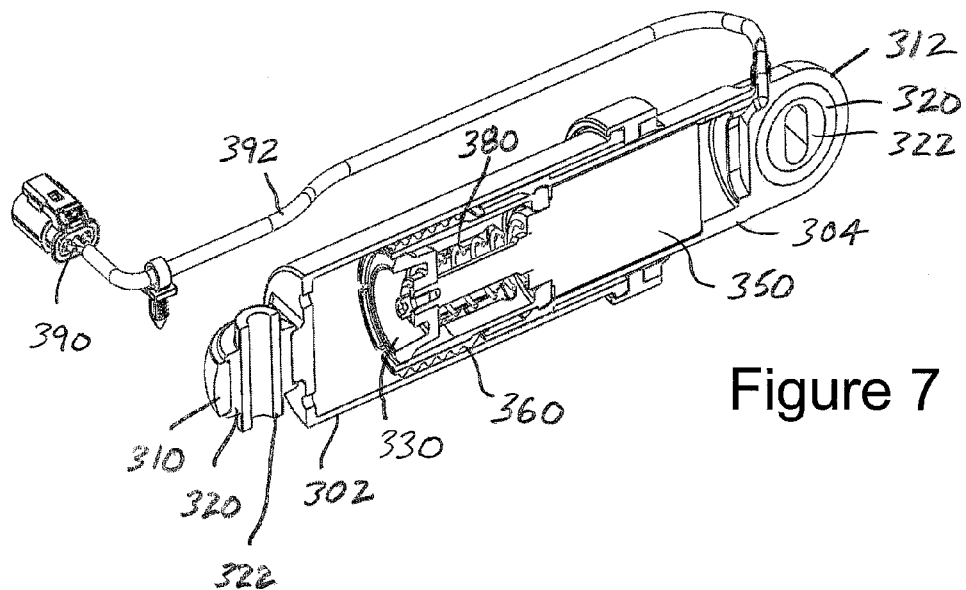
FIG. 7 is a longitudinal, cross-sectional view in perspective of the alternative assembled strut assembly of FIG. 6.
Figure 8:
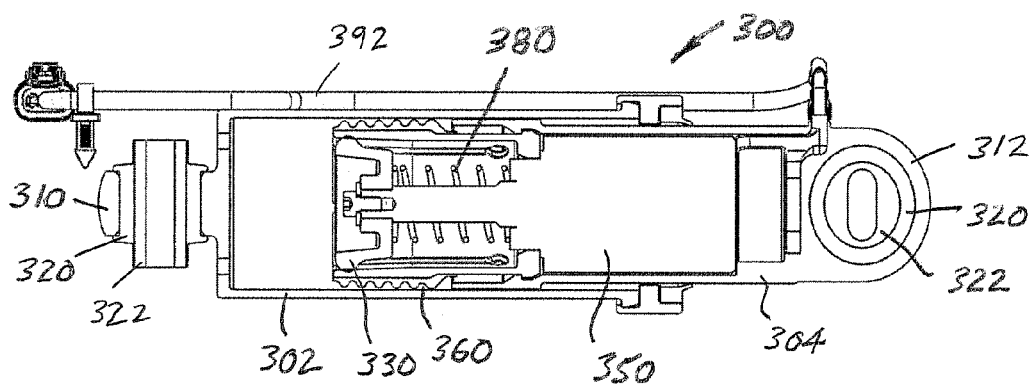
FIG. 8 is an enlarged longitudinal, cross-sectional view of the alternative strut assembly of FIG. 6.

Still another embodiment is illustrated in FIGS. 6-8. Again, for ease of understanding and purposes of brevity, like elements are identified by like reference numerals in the "300" series (housing 102 or 202 from the first and second embodiments of FIGS. 2 and 4, respectively, is now referred to as housing 302) while new components are identified by new reference numerals. This version of the electrically switchable torque strut assembly 300 eliminates use of a stepper motor or a DC motor to operate the drive screw and to pull an expander. Instead, the strut assembly 300 uses a solenoid 350 that is directly connected to expander 330 at one end. The expander 330 is selectively received in collet 360. Preferably, the collet 360 is coated in elastomer or rubber to increase friction between the collet and the inner surface of housing 302 in the locked state. The increased friction likewise results in increased stiffness of the torque strut 300 in the locked state when compared with a locked collet without the rubber coating that could potentially slide if sufficient force is imposed thereon. Thus, the rubber on the collet 360 increases the sliding force considerably. The solenoid 350 directly pulls the expander 330 to the locked position and expands the collet 360 into frictional engagement with the housing 302. When the strut 300 is electrically switched, a return spring 380 returns the expander 332 to the unlocked position (in the left-hand direction of FIGS. 6-8) so that the collet 360 decreases in radial dimension in the housing 302, whereby the housing and shaft 304 move relative to one another in the unlocked state.

The electrical wiring 390 extends through a sheath 392 to provide protection for the wiring as the wiring leads from an electronic control unit (ECU) (not shown) to the shaft or second portion 304 of the strut assembly where the wiring connects with the solenoid 350. Another difference between the embodiment of FIGS. 6-8 and the earlier embodiments is that the eyelets 310, 312 at opposite ends of the strut assembly 300 are disposed 90° relative to one another.

The disclosure is designed to function in temperature ranges from −40° C. to 125° C. The strut housing can be a plastic (likely glass reinforced nylon) or metal (most likely aluminum). The isolator on either end will be a rubber. The total mass of an exemplary embodiment of the disclosure as shown is about 200 g to 300 g, has a length of approximately 240 mm long in its nominal position, and a diameter of approximately 46 mm. The strut is designed to travel +/−30 mm in the preferred embodiment. However, one skilled in the art will recognize that these numerical values are exemplary only and the mass, size, and travel can all be changed and scaled to meet different application requirements.

This strut can be used with all powertrains (gas, diesel, or hybrid) that require control during start-up and shutdown.

Unlike, fluid filled struts, the strut of the present disclosure does not create undesired fluid resonances and creates little to no damping or rate resistance when in the unlocked state. The strut requires power only to switch between lock and unlock states, thereby conserving energy.

The locking and unlocking feature of this strut allows for a significant change in elastomeric rate between the two states. The strut can be locked, power removed, and the strut will hold the locked position. This is advantageous as this feature consumes no energy in the locked state, so that the strut can be locked during shutdown and will remain locked while the powertrain is off, until after the next start-up where power is applied and the strut unlocked for idle and drive conditions.

One end is fastened through the isolator to the Chassis (or Cradle) and the other is fastened through the isolator to the powertrain. The strut assembly locks during the start-up and shutdown cycles, allowing only the rubber isolators to move, generating a high elastomeric rate along the axis of the strut. Positioned in the direction of greatest excitation of the engine, this will reduce the displacement of the powertrain, thereby reducing the vibration and noise perceived by the vehicle occupants. Once start-up or shutdown is complete, the strut is unlocked, and the shaft is allowed to travel in and out of the outer housing, providing little resistance to this motion, and isolating any incoming vibrations regardless of the shaft position relative to the housing.

This strut provides high elastomeric rate resistance during start-up and shutdown to control powertrain motion thereby reducing vibration excitations to the occupant during start/stop events, and switches to a low elastomeric rate state during idle and drive events for improved powertrain isolation.

What is claimed is:

1. A switchable locking torque strut assembly interposed between an associated vehicle chassis and an associated vehicle powertrain that provides high elastomeric rate resistance during start-up and/or shutdown of an associated internal combustion engine (ICE) and low elastomeric rate resistance during idle and/or driving events as communicated thereto by an associated electronic control unit (ECU), the assembly comprising:
   a housing;
   a shaft at least partially received in the housing and operatively mounted for selective relative movement relative to the housing;
   a locking assembly interposed between the shaft and the housing for selectively locking the shaft relative to the housing in response to start-up and/or shutdown of the associated ICE, the locking assembly including one of a collet, elastomeric rubber, or grommet that in the unlocked state does not interact with the housing and allows relative movement between the shaft and the housing and provides a low elastomeric rate resistance, and in the locked state interacts with the housing to limit relative movement between the shaft and the housing and provides a high elastomeric rate resistance; and
   electrical wiring leading from the associated ECU to the locking assembly whereby in response to a signal from the associated ECU, the locking assembly switches from the unlocked state to the locked state, or vice versa.

2. The assembly of claim 1 wherein the locking assembly includes an expander and the collet is generally annular and is selectively increased in dimension by the expander.

3. The assembly of claim 2 wherein the expander and the collet each include cooperating surfaces that selectively increase and decrease a diameter of the collet as the expander and collet are moved relative to one another.

4. The assembly of claim 3 wherein the locking assembly includes one of a solenoid or a motor/screw assembly connected to the associated ECU via the electrical wiring where the solenoid or motor/screw assembly advances and retracts the collet by advancing and retracting the expander relative to the collet.

5. The assembly of claim 1 wherein the locking assembly includes an elastomeric member and an expander operatively that expands the elastomeric member into engagement between the shaft and the housing.

6. The assembly of claim 5 wherein the locking assembly includes a motor and a drive screw operatively connected to the motor and to the expander for selectively advancing the expander relative to the elastomeric member that expands the elastomeric member into operative engagement with the housing and retracting the expander relative to the elastomeric member.

7. The assembly of claim 6 wherein the locking assembly includes a solenoid operatively connected to the expander for directly advancing and retracting the expander, and the elastomeric member is a rubber coating on at least a portion of the collet.

8. The assembly of claim 7 further comprising a biasing member for urging the expander and the collet apart.

9. A method of selectively providing high elastomeric rate resistance between a chassis and a powertrain and low elastomeric rate resistance therebetween in response to an electrical signal from an associated electronic control unit (ECU) indicative of start-u and/or shutdown of an associated internal combustion engine (ICE), the method comprising:
   providing a housing;
   operatively mounting a shaft at least partially in the housing for selective relative movement relative to the housing;
   interposing a locking assembly between the shaft and the housing;
   selectively locking the shaft relative to the housing in response to start-up and/or shutdown of the associated ICE, the locking assembly including one of a collet, elastomeric rubber, or grommet that in the unlocked state does not interact with the housing and allows relative movement between the shaft and the housing and provides a low elastomeric rate resistance, and in the locked state interacts with the housing to limit relative movement between the shaft and the housing and provides a high elastomeric rate resistance;
   providing electrical wiring that leads from the associated ECU to the locking assembly;
   in response to a signal from the associated ECU, switching the locking assembly from the unlocked state to the locked state, or vice versa.

10. The method of claim 9 further comprising configuring an elastomeric member as a part of the shaft whereby the elastomeric member locks the first and second ends from moving relative to one another.

11. The method of claim 10 further comprising expanding the elastomeric member to radially lock the first and second ends.

12. The method of claim 11 wherein the selectively locking step includes expanding the elastomeric member during start-up and/or shutdown of an associated internal combustion engine (ICE).

13. The method of claim 12 wherein the selectively unlocking step occurs during idle and/or driving events.

14. The method of claim 9 wherein the selectively locking step occurs during start-up and/or shutdown of an associated internal combustion engine (ICE).

15. The method of claim 14 wherein the selectively unlocking step occurs during idle and/or driving events.

* * * * *